United States Patent
Nagata

(10) Patent No.: US 9,823,643 B2
(45) Date of Patent: Nov. 21, 2017

(54) CONTROLLER FOR MACHINE TOOL

(71) Applicant: FANUC Corporation, Yamanashi (JP)

(72) Inventor: Daisuke Nagata, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 528 days.

(21) Appl. No.: 14/459,442

(22) Filed: Aug. 14, 2014

(65) Prior Publication Data
US 2015/0057789 A1 Feb. 26, 2015

(30) Foreign Application Priority Data

Aug. 21, 2013 (JP) .................................. 2013-171568

(51) Int. Cl.
G05B 11/01 (2006.01)
G05B 19/18 (2006.01)

(52) U.S. Cl.
CPC ........... G05B 19/188 (2013.01); G05B 19/18 (2013.01); G05B 2219/32002 (2013.01)

(58) Field of Classification Search
CPC ...... B25J 9/1664; B25J 9/1671; Y02P 90/265; Y02P 90/087; Y02P 90/18; G05B 2219/35585; G05B 19/414; G05B 19/4093; G05B 2219/34208; G06F 17/5009; G06F 2217/06; G06F 17/50; G06F 17/5086
See application file for complete search history.

(56) References Cited

U.S. PATENT DOCUMENTS

| 8,844,104 | B2* | 9/2014 | Gray | B23Q 39/027 29/27 C |
| 2002/0029219 | A1* | 3/2002 | Mulzer | G06T 19/00 |
| 2002/0089499 | A1* | 7/2002 | Lee | G06T 17/005 345/419 |
| 2003/0014151 | A1* | 1/2003 | Nigazawa | G05B 19/414 700/186 |
| 2003/0090491 | A1* | 5/2003 | Watanabe | B25J 9/1671 345/473 |
| 2003/0120376 | A1* | 6/2003 | Shibata | G05B 19/41 700/189 |
| 2005/0139036 | A1* | 6/2005 | Kato | B23Q 1/287 74/813 L |

(Continued)

FOREIGN PATENT DOCUMENTS

| JP | 2002-108425 A | 4/2002 |
| JP | 2003-266275 A | 9/2003 |

(Continued)

OTHER PUBLICATIONS

Decision to Grant a Patent mailed Dec. 2, 2014, corresponding to Japanese patent application No. 2013-171568.

(Continued)

Primary Examiner — Darrin Dunn
(74) Attorney, Agent, or Firm — Hauptman Ham, LLP

(57) ABSTRACT

A machine tool controlled by a numerical controller is provided with an additional-axis composed of a tilting table and a rotary table. The controller displays, in a display section thereof, a diagram representative of an actual state in which an additional shaft is mounted so that an operator can select how to mount the additional shaft on the machine tool and collectively set parameters based on the selection.

4 Claims, 8 Drawing Sheets

(56) References Cited

U.S. PATENT DOCUMENTS

| | | | |
|---|---|---|---|
| 2006/0129270 A1* | 6/2006 | Pankl | G05B 19/4097 700/182 |
| 2006/0279574 A1* | 12/2006 | Pannese | G06T 13/20 345/474 |
| 2006/0279575 A1* | 12/2006 | Pannese | G06T 13/20 345/474 |
| 2008/0058984 A1* | 3/2008 | Gray | G05B 19/4069 700/192 |
| 2009/0248369 A1* | 10/2009 | Debono | G06F 17/50 703/1 |
| 2009/0271016 A1 | 10/2009 | Wampler et al. | |
| 2010/0030539 A1* | 2/2010 | Chandhoke | G05B 17/02 703/7 |
| 2012/0191238 A1 | 7/2012 | Sakai et al. | |
| 2012/0330456 A1* | 12/2012 | Tsuda | G05B 19/4061 700/186 |
| 2014/0046476 A1* | 2/2014 | Walker | B21F 3/02 700/165 |
| 2014/0163738 A1* | 6/2014 | Suzuki | G05B 19/402 700/275 |
| 2014/0236565 A1* | 8/2014 | Kuwahara | B25J 9/1671 703/22 |
| 2015/0231524 A1* | 8/2015 | Fisher | A63J 99/00 700/275 |

FOREIGN PATENT DOCUMENTS

| | | |
|---|---|---|
| JP | 2008-186434 A | 8/2008 |
| JP | 2010-274377 A | 12/2010 |
| JP | 2012-164306 A | 8/2012 |
| WO | 2011/111088 A1 | 9/2011 |

OTHER PUBLICATIONS

T. Moriwaki, "Multi-functional machine tool.", CIRP Annals—Manufacturing Technology, 57, 2008, 2, pp. 736-749, ISSN 1726-0604 (e); 0007-0806 (p). DOI: 10.1016/j.cirp.2008.09.004.

Ch. Kircher, "Selbstadaptierende NC-Steuerung fur rekonfigurierbare Werkzeugmaschinen (Self-adapting Numerical Control for reconfigurable machine tools)" Heimsheim: Jost Jetter, 2011. p. 125-130—ISBN 978-3-939890-79-9. http://dx.doi.org/10.18419/opus-6773 [retrieved on Nov. 18, 2016], for which English abstract is attached.

Office Action in DE Application No. 1020141116178, dated Nov. 21, 2016.

* cited by examiner

CONTROLLER FOR MACHINE TOOL

RELATED APPLICATIONS

The present application claims priority to Japanese Application Number 2013-171568, filed Aug. 21, 2013, the disclosure of which is hereby incorporated by reference herein its entirety.

BACKGROUND OF THE INVENTION

Field of the Invention

The present invention relates to a controller for a machine tool, which is provided with an additional-axis composed of a tilting table and a rotary table, one of which is assumed to be a first axis of additional shaft and the other of which is assumed to be a second axis of additional shaft.

Description of the Related Art

In mounting an additional-axis on a machine tool such as a machining center, the manufacturer of the machine tool, a setup maker of jigs and the like, or an end user may alternatively mount an additional shaft on the machine tool and set parameters.

In the case where the machine tool manufacturer or setup maker performs the additional shaft mounting on the machine tool and the parameter setting, the user is not expected to perform these operations to move the additional shaft.

In the case where the user mounts the additional shaft on the machine tool, in contrast, the additional shaft to be mounted should be one that is manufactured by a manufacturer different from the machine tool manufacturer, since many machine tool manufacturers neither manufacture additional shafts in-house nor mount them.

Therefore, the user must purchase the machine body and the additional shaft from different manufacturers, accurately mount the additional shaft unaided on the machine tool, and set parameters. Since mounting and leveling the additional shaft on the machine tool require accuracy, the user's operation is inevitably time-consuming.

Normally, however, users do not want to take much time to set the parameters to control the additional shaft for movement. Accordingly, many machine tool manufacturers select the model numbers of the additional shaft, a motor used for the additional shaft, etc., so that the machine tool can be provided with the function of setting some of the parameters, thereby reducing the parameter setting time.

As a prior art example of the function of collectively setting parameters, Japanese Patent Application Laid-Open No. 2002-108425 discloses a parameter collective setting method to be performed as the table loading capacity of a machine tool is set. This patent document describes how to collectively set control parameters by selecting a weight corresponding to the gross weight of jigs and the like in a table from among a plurality of set weights.

According to the technique disclosed in Japanese Patent Application Laid-Open No. 2002-108425, the parameters can be collectively set by estimating the gross weight and selecting a weight similar to it. Mechanical operations can be performed even if a wrong weight is selected. According to the prior art technique, moreover, some of the parameters can be collectively set by selecting the respective model numbers of a motor and an additional shaft.

Since the orientation of the additional shaft to be mounted on the machine tool, the rotation direction of the shaft, etc., are differently set depending on the mounting state of the table, however, there is no function to collectively set parameters for such setting. Therefore, an operator must set these parameters one by one, resulting in time-consuming parameter setting. Further, some of the parameters are so difficult to set that the operator may set them wrongly.

SUMMARY OF THE INVENTION

Accordingly, the object of the present invention is to provide a controller for a machine tool, capable of preventing errors in parameter setting in additional shaft mounting and enabling quick setup.

According to the present invention, the above-described problems are solved in such a manner that a diagram representative of an actual state in which an additional shaft is mounted is displayed in a display section of the controller, so that an operator can select how to mount the additional shaft on the machine tool and collectively set parameters based on the selection.

In a controller for a machine tool according to the present invention, the machine tool comprises an additional-axis composed of a tilting table and a rotary table. The controller comprises: an option storage section configured to store a plurality of options to be selected by an operator to set control parameters for an additional shaft in a manner such that, for each of the plurality of options, an explanatory diagram illustrating the option, a control parameter item to be set when the option is selected, and a set value of the item are associated with the option; a selection section configured to select a specific one of the options; a display section configured to read an explanatory diagram associated with the specific option selected in the selection section from the option storage section and display the explanatory diagram; and a parameter setting section configured to read the control parameter item associated with the specific option selected in the selection section and the set value of the item and to set the set value of the item to the read control parameter item.

The option may be used to select a direction in which the additional-axis table is mounted on the machine tool, and the explanatory diagram illustrates the mounting direction of the additional-axis table selected by the option.

The option may be used to assign one of the tilting table and the rotary table to a first axis of the additional shaft and the other to a second axis of the additional shaft, the explanatory diagram comprises a diagram obtained by changing the display state of the tilting table part of the additional-axis table and a diagram obtained by changing the display state of the rotary table part of the additional-axis table, and the display section is configured to display the diagram obtained by changing the display state of the tilting table part of the additional-axis table when the assignment of the tilting table as the first or second axis of the additional shaft is selected by the selection section and to display the diagram obtained by changing the display state of the rotary table part of the additional-axis table when the assignment of the rotary table as the first or second axis of the additional shaft is selected by the selection section.

The option may be an option for selecting the directions of forward rotation of first and second axes of the additional shaft, and the explanatory diagram illustrates the selected directions of forward rotation of the first and second axes of the additional shaft.

According to the present invention, there can be provided a controller for a machine tool, capable of preventing errors in parameter setting in additional shaft mounting and enabling quick setup.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

A machine tool controlled by a controller according to the present invention comprises an additional shaft composed of a tilting table and a rotary table. One of these tables is assumed to be a first axis of additional shaft, and the other is assumed to be a second axis of additional shaft. The terms "additional shaft," "additional-axis" and "additional-axis table" are used interchangeably herein to designate a structure including a tilting table and a rotary table as described, for example, with respect to FIG. 1.

Figure 1:
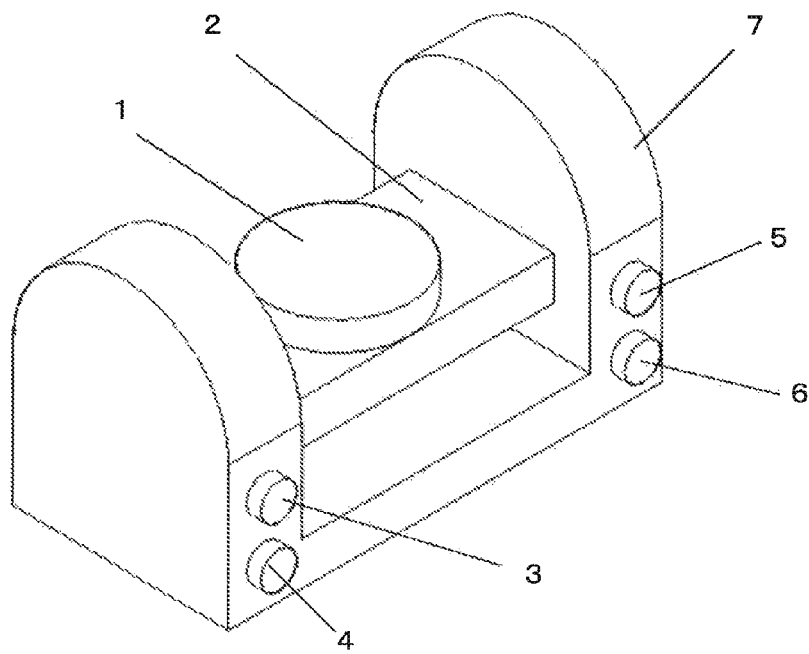
FIG. 1 is a view showing a simple model of an additional shaft of a machine tool.

FIG. 1 shows a simple model of the additional shaft of the machine tool.

The additional shaft comprises a cylindrical rotary shaft 1 and a cuboid tilting shaft 2 underlying the rotary shaft 1. Further, the additional shaft is provided with cable connection terminals 3 to 6, which are connected with cables (not shown) for connection with the machine tool. Thus, the connection terminals 3 to 6 are disposed on the back side of the additional shaft.

Examples of a screen for setting parameters of the additional shaft will be described with reference to FIGS. 2 and 3.

Figure 2:
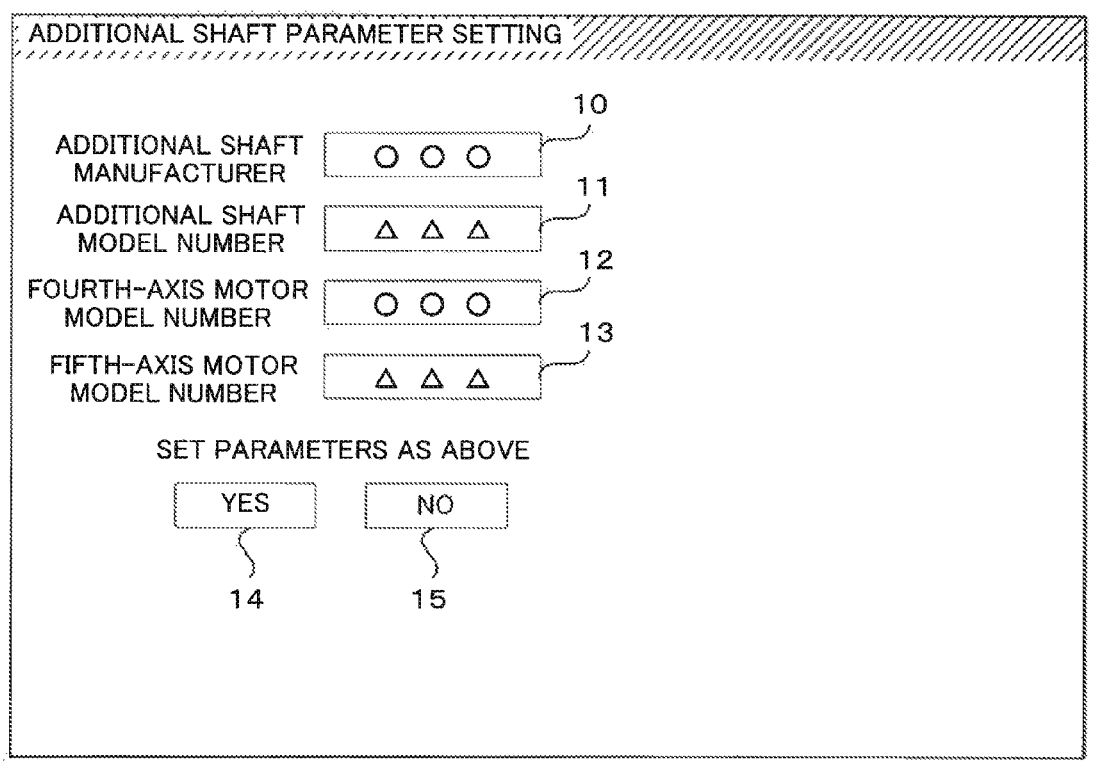
FIG. 2 shows an example of a screen for setting parameters of the additional shaft.

Parameter collective setting can be completed by depressing a button "YES" 14 after selecting an "additional shaft manufacturer" 10, "additional shaft model number" 11, and motor model numbers ("fourth-axis motor model number" 12 and "fifth-axis motor model number" 13), as shown in FIG. 2. If a button "NO" 15 is depressed, the input parameters are reset.

Figure 3:
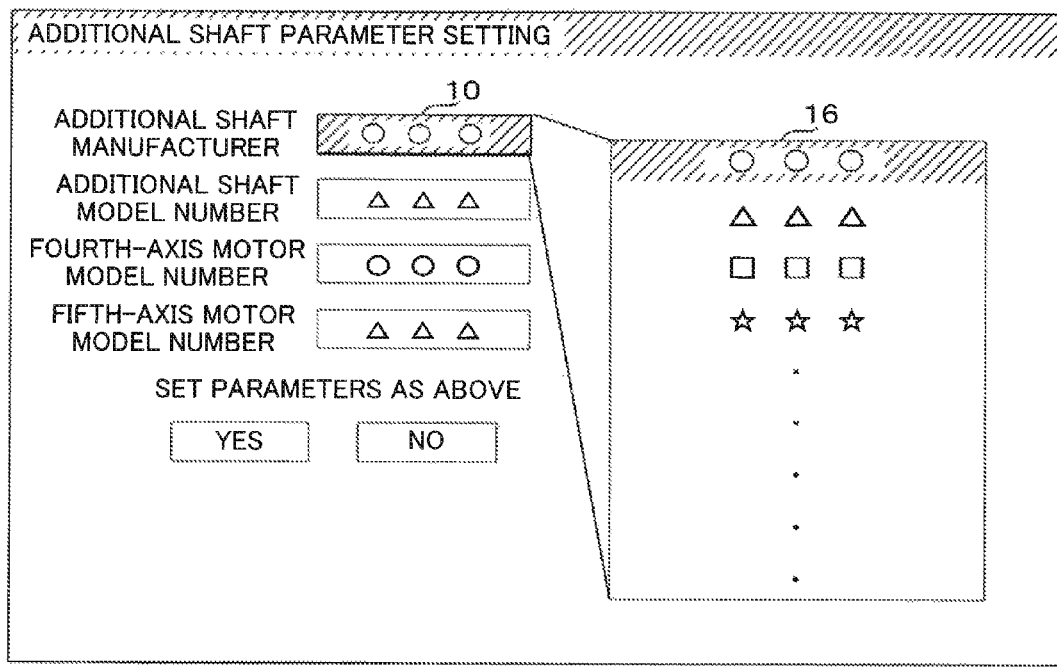
FIG. 3 is a diagram illustrating how a manufacturer list is displayed in a popup window when a cursor is moved to an item "additional shaft manufacturer" on the screen of FIG. 2.
Figure 4:
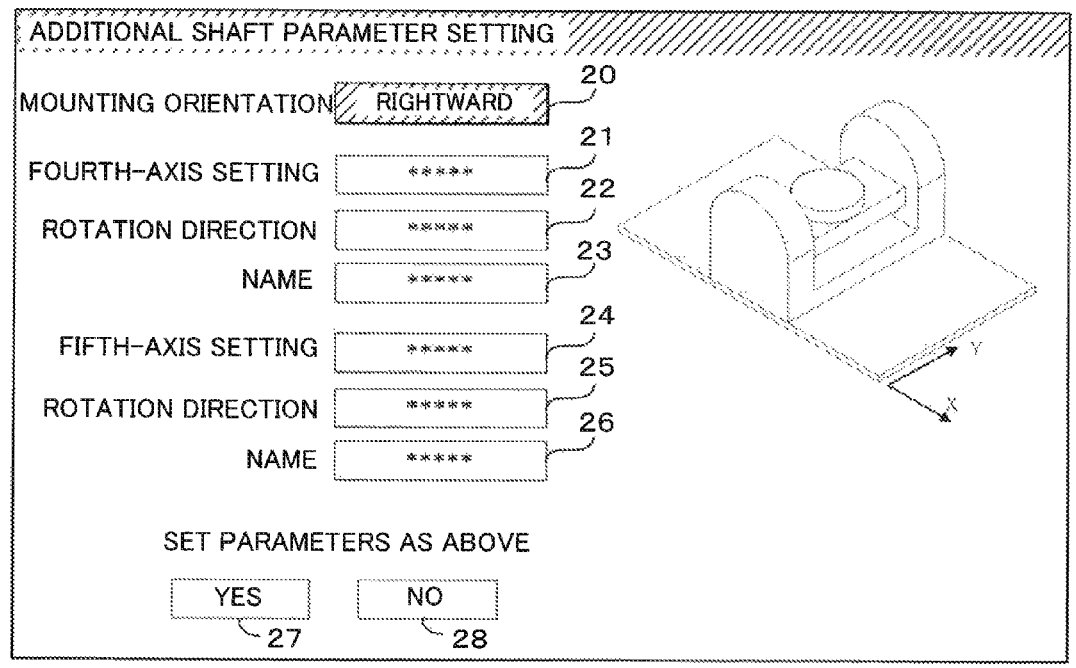
FIG. 4 shows a screen example for setting an orientation (rightward) of the additional shaft to be mounted.
Figure 5:
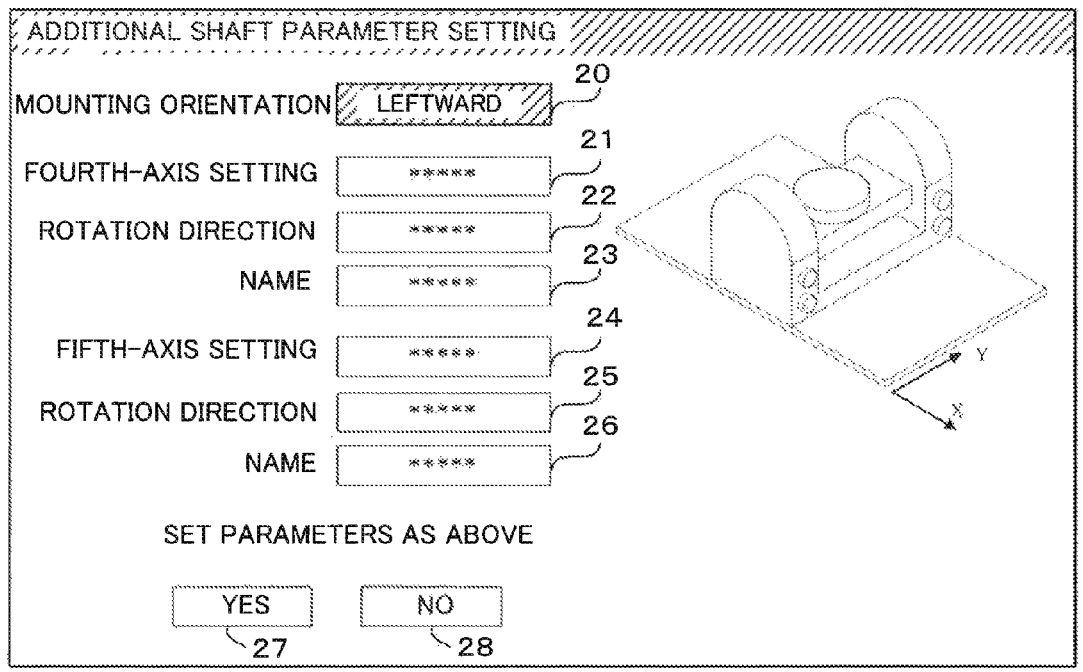
FIG. 5 shows a screen example for setting an orientation (leftward) of the additional shaft to be mounted.
Figure 6:
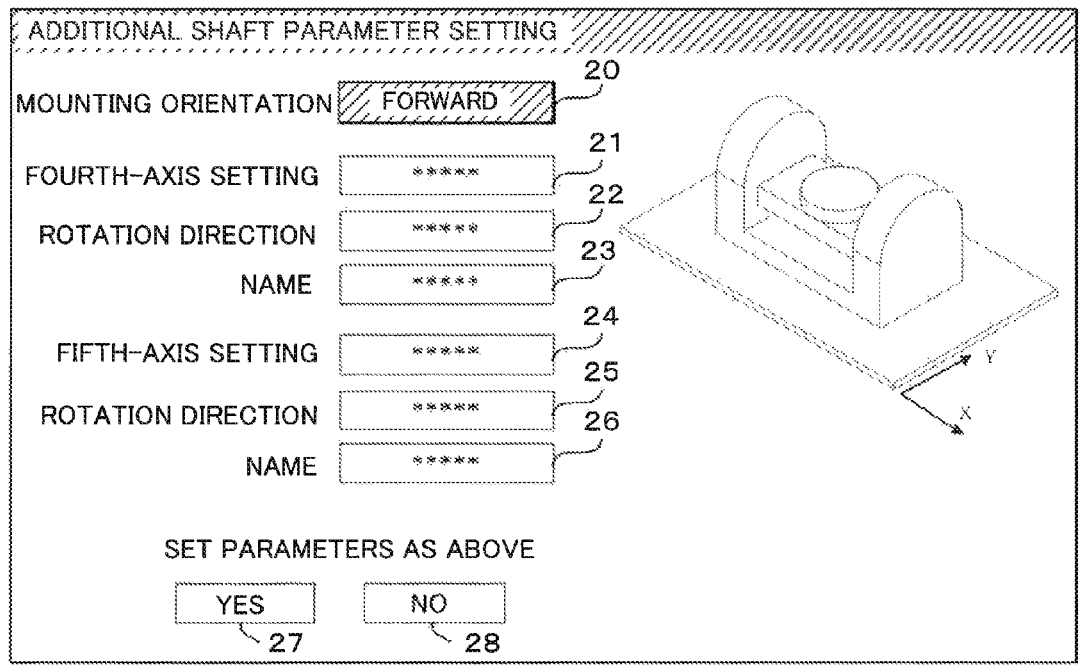
FIG. 6 shows a screen example for setting an orientation (forward) of the additional shaft to be mounted.

Then, a cursor is moved to the item "additional shaft manufacturer" 10 on the screen of FIG. 2, as shown in FIG. 3. Thereupon, a previously registered manufacturer list is displayed in a popup window 16. The position to which the cursor is moved is displayed in a different color. The manufacturer of the additional shaft to be mounted is selected from the manufacturer list displayed in the popup window 16. Likewise, the model number of the additional shaft is selected from a list of the "additional shaft model numbers" 11.

By thus selecting the manufacturer and model number of the additional shaft, the model number of a motor for the tilting shaft is automatically selected as an initial value for a fourth axis, and that of a motor for the rotary shaft is automatically selected for a fifth axis. In setting the additional shaft manufacturer and the motor model numbers individually, not collectively, a specific manufacturer and a specific motor model number are selected from the lists by moving the cursor to the items concerned.

Setting the orientation of the additional shaft to be mounted will now be described with reference to FIGS. 4 to 7.

Figure 7:
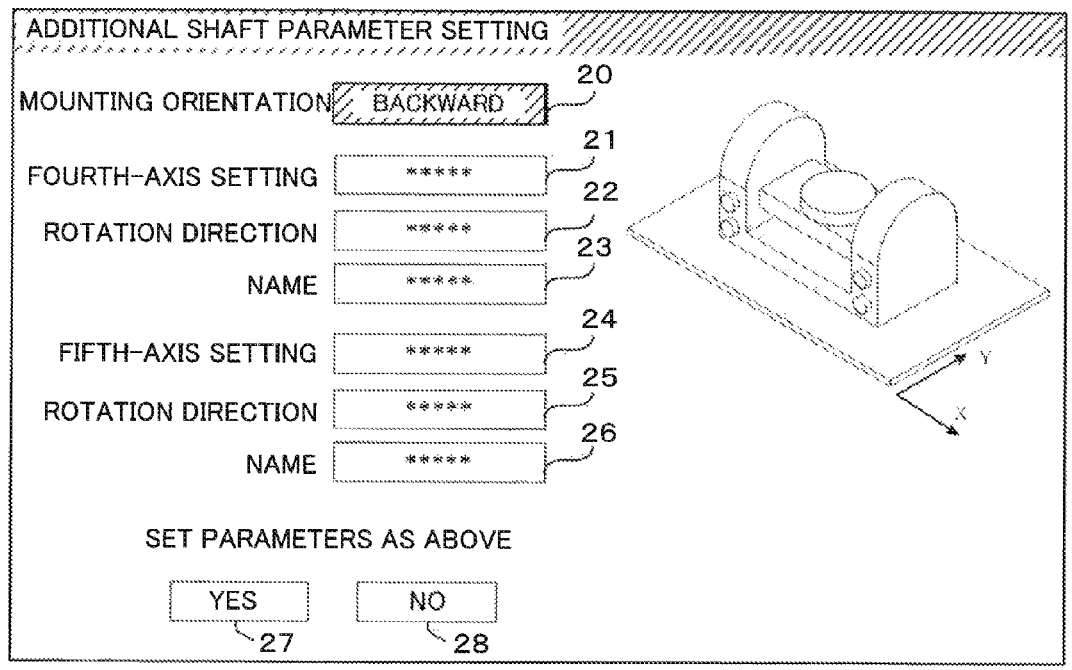
FIG. 7 shows a screen example for setting an orientation (backward) of the additional shaft to be mounted.

There are four ways of setting a "mounting orientation" 20, including "rightward" (FIG. 4), "leftward" (FIG. 5), "forward" (FIG. 6), and "backward" (FIG. 7).

Each time the orientation of the additional shaft to be mounted is set with the cursor moved to the item "mounting orientation" 20, a mounting diagram for the additional shaft corresponding to the orientation to be set on the table is displayed on a display section of the controller. The following is a description of an example in which the orientation of the additional shaft to be mounted is set to "forward".

In FIGS. 4 to 7 (screen examples displayed on the display section of the controller), reference numeral 20 denotes "mounting orientation", reference numerals 22 and 25 denote "rotation direction", reference numerals 21 and 24 denote "fourth-axis setting" and "fifth-axis setting", respectively, reference numerals 23 and 26 denote "name", and reference numerals 27 and 28 denote "YES" and "NO", respectively.

Figure 8:
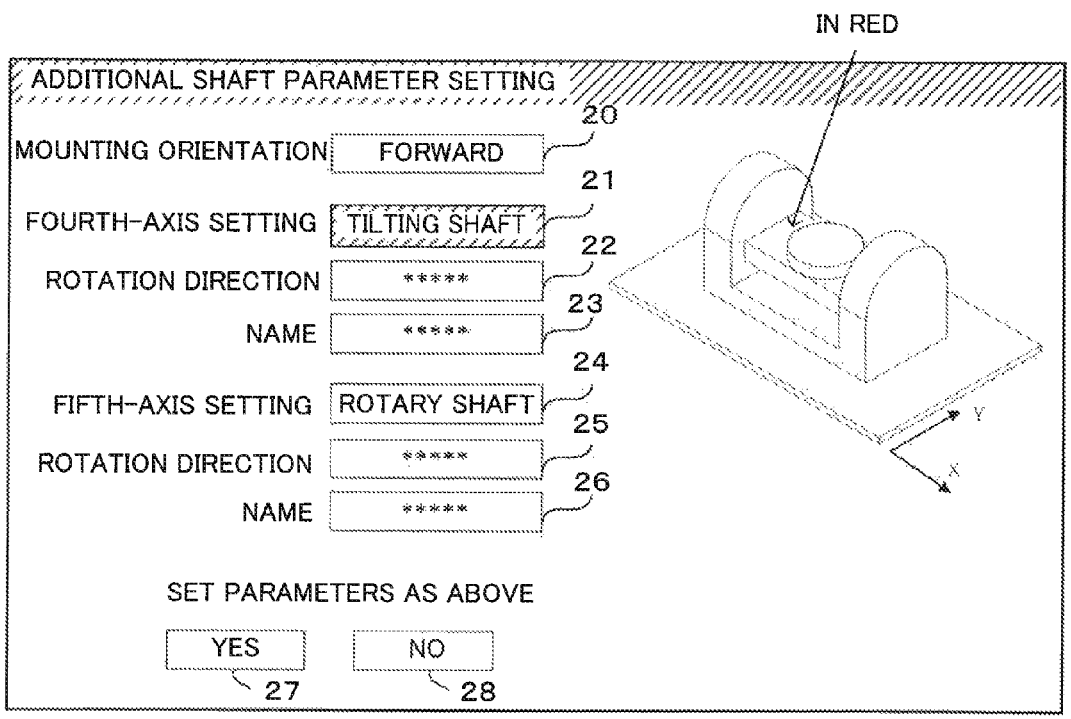
FIG. 8 is a diagram illustrating that, from among a tilting shaft and a rotary shaft, the tilting shaft is selected as a fourth axis for the additional shaft (as a result, the rotary shaft is selected as a fifth axis)
Figure 9:
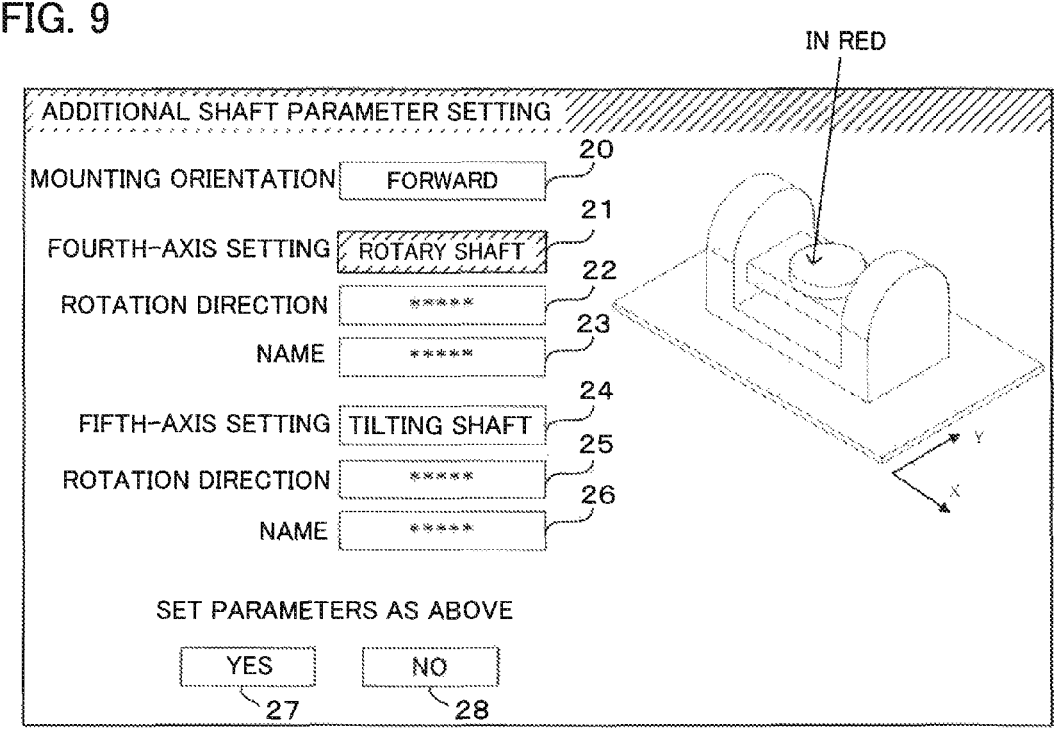
FIG. 9 is a diagram illustrating that, from among a tilting shaft and a rotary shaft, the rotary shaft is selected as the fourth axis (as a result, the tilting shaft is selected as the fifth axis)

Referring now to FIGS. 8 and 9, there will be described how the tilting shaft or the rotary shaft is selected as the fourth axis in the "fourth-axis setting" 21.

In the example of FIG. 8, the "tilting shaft" is shown as being selected by moving the cursor to the "fourth-axis setting" 21. In this selection, a shaft constituting an additional shaft on the screen that corresponds to the tilting shaft set as the fourth axis is highlighted in red.

In the example of FIG. 9, on the other hand, the "rotary shaft" is shown as being selected by moving the cursor to the "fourth-axis setting" 21. In this selection, a shaft constituting an additional shaft on the screen that corresponds to the rotating shaft set as the fourth axis is highlighted in red.

For the fifth axis, the shaft which is not selected as the fourth axis is automatically selected as the fifth axis. Thus, in the example of FIG. 8, as the "tilting shaft" is selected in the "fourth-axis setting" 21, the "rotary shaft" is automatically selected in the "fifth-axis setting" 24. In the example of FIG. 9, in contrast, as the "rotary shaft" is selected in the "fourth-axis setting" 21, the "tilting shaft" is automatically selected.

In the collective setting shown in FIGS. 2 and 3, if motors of different model numbers are used for the fourth and fifth axes, it is automatically determined whether each of these axes is the tilting shaft or the rotary shaft, by selecting the motor model numbers ("fourth-axis motor model number" 12 and "fifth-axis motor model number" 13).

Figure 10:
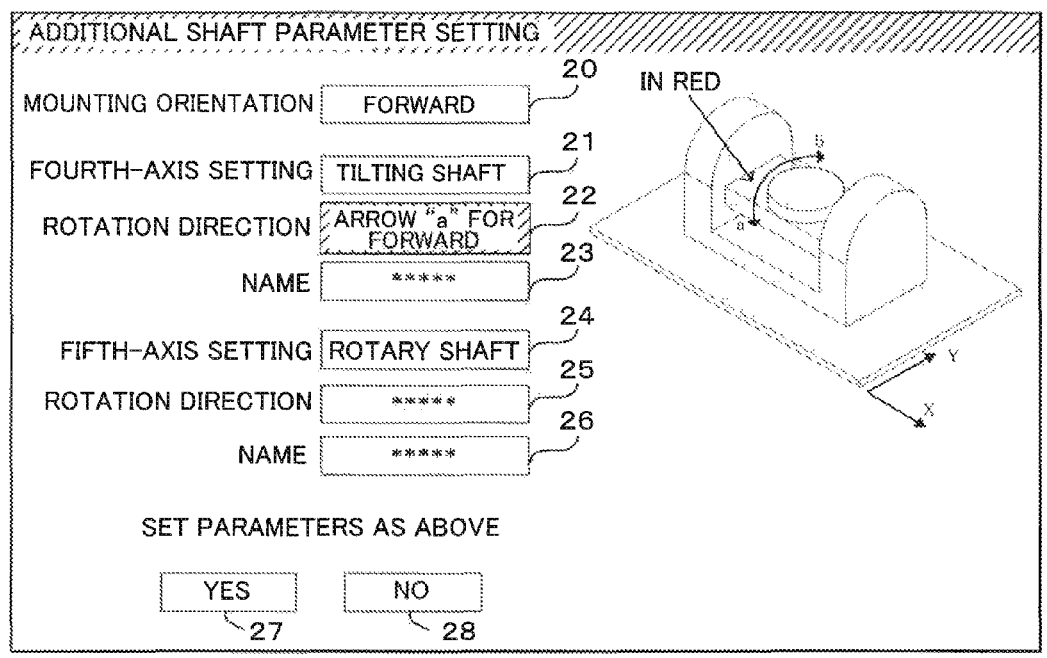
FIG. 10 is a diagram illustrating how to set the direction of forward rotation of the fourth axis for the tilting shaft.
Figure 11:
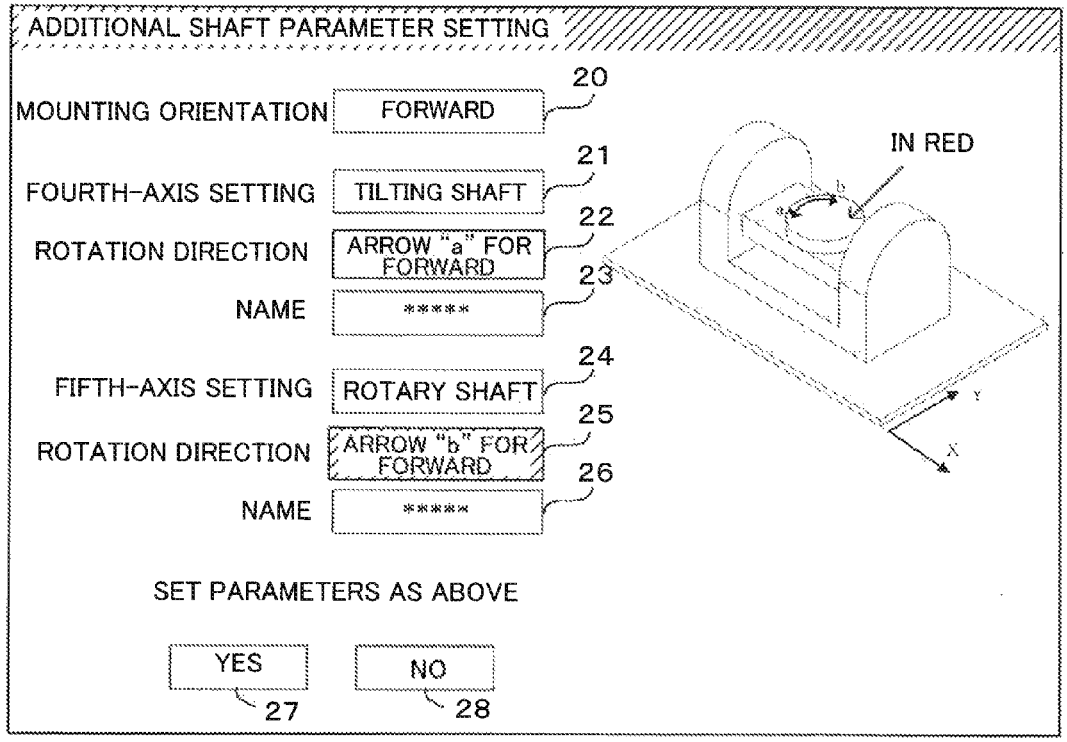
FIG. 11 is a diagram illustrating how to set the direction of forward rotation of the fifth axis for the rotary shaft.

Referring now to FIGS. 10 and 11, there will be described how to set the directions of forward rotation of the fourth and fifth axes for the tilting or rotary shaft.

In FIG. 10, a shaft constituting an additional shaft on the screen that corresponds to the tilting shaft set as the fourth axis is highlighted in red, and the direction of forward rotation of the tilting shaft is indicated by arrow "a" in the "rotation direction" 22.

In FIG. 11, a shaft constituting an additional shaft on the screen that corresponds to the rotating shaft set as the fifth axis is highlighted in red, and the direction of forward rotation of the rotary shaft is indicated by arrow "b" in the "rotation direction" 25.

In setting the rotation direction of the rotary shaft, the directions "a" and "b" do not change without regard to the orientation of the rotary shaft to be mounted ("mounting orientation" 20 of FIGS. 4 to 7), since the axis of the rotary shaft is always oriented vertically. In setting the rotation direction of the tilting shaft, however, it is to be noted that the directions "a" and "b" inevitably change if the orientation of the tilting shaft to be mounted is changed.

In setting the rotation direction of the tilting shaft, therefore, it is conventionally necessary to take account of the orientation of the tilting shaft to be mounted on each occasion. According to the present invention, however, errors in setting the rotation direction of the tilting shaft can be eliminated by selecting a diagram in the screen of the controller to determine the rotation direction.

Figure 12:
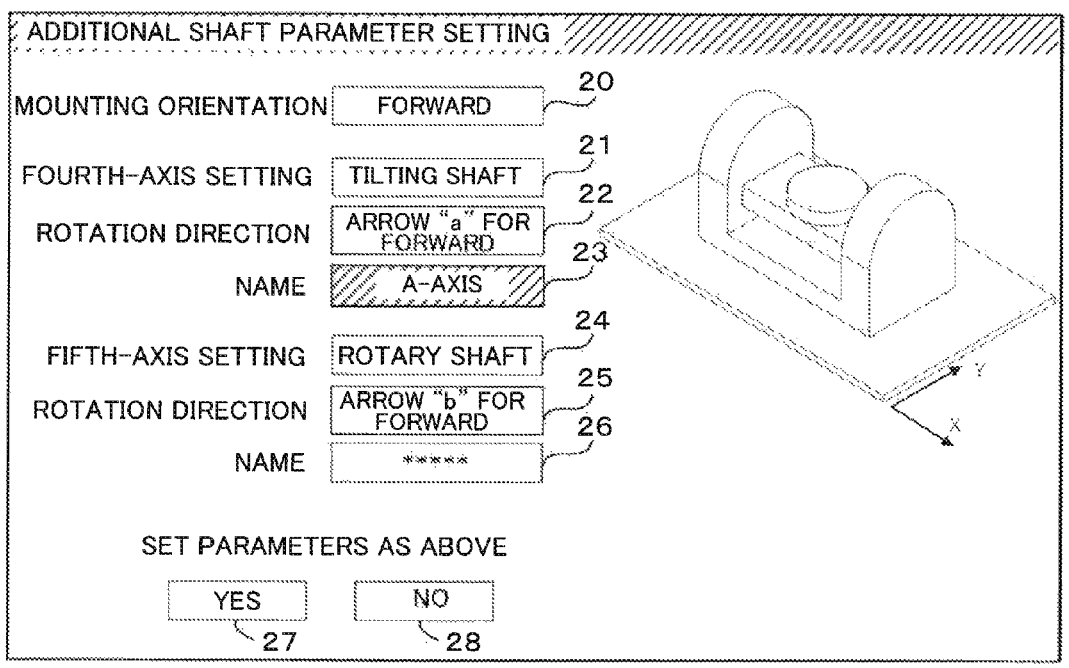
FIG. 12 is a diagram illustrating how to set the name of the set additional shaft (fourth and fifth axes)

Referring now to FIG. 12, there will be described how to set the name of the tilting shaft for the fourth axis (and the fifth axis) for which the rotation direction is set.

The name of the fourth axis is set to be an "A-axis" in the "name" 23. Likewise, the name of the fourth axis is set in the "name" 26 (although not set in FIG. 12 yet).

When all the items "mounting orientation" 20, "fourth-axis setting" 21, "rotation direction" 22, "name" 23, "fifth-axis setting" 24, "rotation direction" 25, and "name" 26 are thus displayed and if it is confirmed that they are all set correctly, the "YES" 27 of FIG. 12 is performed to collectively set the relevant parameters.

Figure 13:
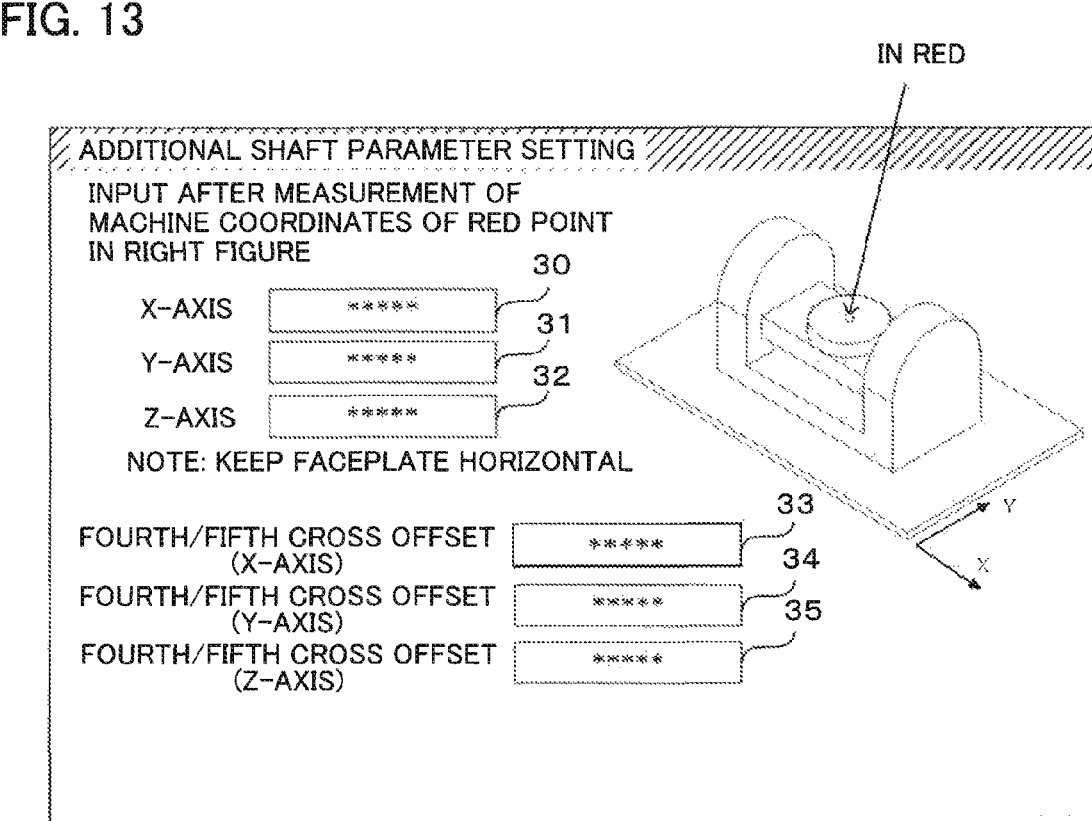
FIG. 13 is a diagram illustrating how machine coordinate values (the central coordinate value of a faceplate and the coordinate value of the height of the faceplate top) are input.

As shown in FIG. 13, moreover, the central coordinate value of a faceplate and the height of the faceplate top are input as machine coordinate values on the next screen.

The central coordinate value of the faceplate and the height of the faceplate top are input after the machine coordinates of a point indicated in red are measured, as shown in FIG. 13. Based on the resulting measured data, the numerical controller for the machine tool calculates the respective central coordinate values of the tilting and rotary shafts and automatically inputs them to the parameters. While the central coordinate value of the rotary shaft is input as it is, that of the tilting shaft is calculated by equation (1) as follows:

$$\text{Central coordinate value of tilting shaft} = \text{machine coordinate value of faceplate top} - \text{height of faceplate top above tilting shaft center.} \quad (1)$$

"Machine coordinate value of faceplate top" on the right side of equation (1) is data obtained by measurement. Since "height of faceplate top above tilting shaft center" is data inherent to an additional shaft, on the other hand, it is acquired with reference to the data sheet of the additional shaft.

Then, errors of the additional shaft in the X-, Y-, and Z-axis directions and the height of the faceplate top above the tilting shaft center are input. Since these values are inherent to the additional shaft, they are acquired with reference to the data sheet of the additional shaft concerned.

Reference numerals 30, 31, and 32 denote input items "X-axis", "Y-axis" and "Z-axis", respectively, and reference numerals 33, 34, 35 denote input items "fourth/fifth-axis cross offset (X-axis)", "fourth/fifth-axis cross offset (Y-axis)"; and "fourth/fifth-axis cross offset (Z-axis)", respectively.

In this way, setting for the activation of the additional shaft is completed.

Figure 14:
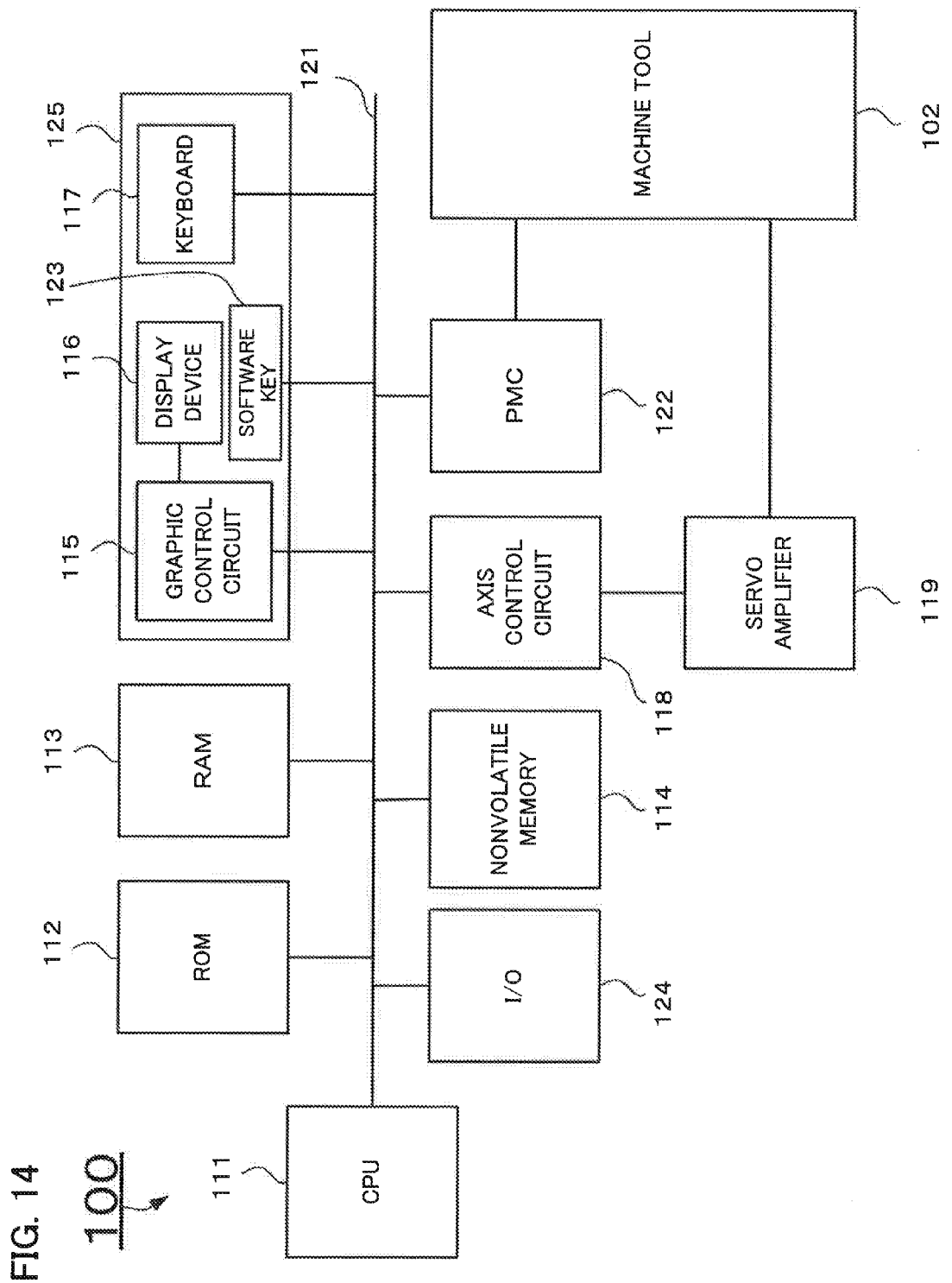
FIG. 14 is a diagram illustrating one embodiment of a controller for the machine tool according to the present invention.

One embodiment of the controller for a machine tool according to the present invention will be described with reference to FIG. 14.

A numerical controller 100 controls a machine tool 102. The machine tool 102 comprises an additional shaft composed of a tilting table and a rotary table. One of these tables (or axes) is assumed to be a first axis of additional shaft, and the other is assumed to be a second axis of additional shaft.

As described before, according to the function of the numerical controller 100, parameters are set as diagrams are selected in the display section of the numerical controller 100. A CPU 111 for use as a processor controls the entire numerical controller 100 according to a system program or a program for performing parameter setting by selecting the diagrams in the display section, which is stored in a ROM 112. Various data or input/output signals are stored in a RAM 113. Various data stored in a nonvolatile memory 114 are retained even after the power is turned off. In the nonvolatile memory 114, a plurality of options to be selected by an operator to set control parameters for the additional shaft are stored in a manner such that, for each of the plurality of options, an explanatory diagram illustrating the option, a control parameter item to be set when the option is selected, and a set value of the item are associated with the option. The program for performing the parameter setting by selecting the diagram in the display section according to the present invention comprises a selection function (selection section), display function (display section), and parameter setting function (parameter setting section). The selection section serves to select a specific one of the options. The display section serves to read an explanatory diagram associated with the selected specific option from an option storage section and display it. The parameter setting section serves to read the control parameter item associated with the selected specific option and the set value of the item and to set the read control parameter item and the set value of the item.

A graphic control circuit 115 converts digital signals to display signals and deliver them to a display device 116. A keyboard 117 is a means for inputting various set data including numeric keys, character keys, etc.

An axis control circuit 118 outputs axis commands to a servo amplifier 119 on receiving axis movement commands from the CPU 111. The servo amplifier 119 drives a servomotor (not shown) of the machine tool 102 on receiving the axis movement commands. These constituent elements are connected to one another by a bus 121. A programmable machine controller (PMC) 122 receives a T-function signal (tool selection command) and the like through the bus 121 during the execution of a machining program. The PMC 122 processes this signal based on a sequential program and outputs an operation command signal to control the machine tool 102.

On receiving a state signal from the machine tool 102, moreover, the PMC 122 transfers a necessary input signal to the CPU 111. Further, the bus 121 is connected with a software key 123, whose function varies depending on the sequential program or the like, and an interface 124 through which NC data are transmitted to an external equipment such as a storage device. The software key 123, along with the display device 116 and the keyboard 117, is provided on a display/MDI panel 125.

As described above, the parameters can be set by selecting the diagrams in the display section of the controller for the machine tool. Further, the machine tool can be made to recognize how the additional shaft is mounted. Conventionally, it is necessary to make the machine tool recognize how the additional shaft is mounted by inputting the parameters one by one. According to the present invention, however, the parameter setting is enabled by selecting the diagrams in the display section of the controller, so that the number of parameters to be input can be considerably reduced, and therefore, the setting time can be reduced.

The invention claimed is:

1. A controller for a machine tool, the machine tool comprising an additional-axis table including a tilting table and a rotary table, the controller comprising:
    an option storage section configured to store a plurality of options to be selected by an operator to set control parameters for the tilting table and the rotary table in a manner such that, for each of the plurality of options, (i) an explanatory diagram illustrating the tilting table and the rotary table according to the option, (ii) a control parameter item to be set when the option is selected, and (iii) a set value of the control parameter item are associated with the option;
    a selection section configured to select a specific one of the plurality of options;
    a display section configured to read the explanatory diagram associated with the specific option selected in the selection section from the option storage section and display the explanatory diagram; and
    a parameter setting section configured
        to read the control parameter item associated with the specific option selected in the selection section and the set value of the control parameter item, and
        to assign the set value of the control parameter item to the read control parameter item,
    wherein
    the display section is configured to display the explanatory diagram associated with the selected specific option together with the read control parameter item and the set value of the control parameter item, and
    the display section is configured to change a display state of the tilting table or rotary table based on an assignment of the tilting table or rotary table as an axis of the additional-axis table in accordance with the specific option selected in the selection section.

2. The controller according to claim 1, wherein the option corresponds to a selection of a mounting direction in which the additional-axis table is mounted on the machine tool, and the explanatory diagram associated with the option illustrates the mounting direction of the additional-axis table corresponding to the option.

3. The controller according to claim 1, wherein the option corresponds to a selection of directions of forward rotation of first and second axes of the additional-axis table, and the explanatory diagram associated with the option illustrates the selected directions of forward rotation of the first and second axes of the additional-axis table corresponding to the option.

4. A controller for a machine tool, the machine tool comprising an additional-axis table composed of a tilting table and a rotary table, the controller comprising:
    an option storage section configured to store a plurality of options to be selected by an operator to set control parameters for the additional-axis table in a manner such that, for each of the plurality of options, an explanatory diagram illustrating the option, a control parameter item to be set when the option is selected, and a set value of the control parameter item are associated with the option;
    a selection section configured to select a specific one of the plurality of options;
    a display section configured to read the explanatory diagram associated with the specific option selected in the selection section from the option storage section and display the explanatory diagram; and
    a parameter setting section configured
        to read the control parameter item associated with the specific option selected in the selection section and the set value of the control parameter item, and
        to assign the set value of the control parameter item to the read control parameter item,
    wherein
    the option is used to assign one of the tilting table and the rotary table to a first axis of the additional-axis table and the other to a second axis of the additional-axis table,
    the explanatory diagram comprises
        a diagram obtained by changing a display state of the tilting table of the additional-axis table, and
        a diagram obtained by changing a display state of the rotary table of the additional-axis table, and
    the display section is configured
        to display the diagram obtained by changing the display state of the tilting table of the additional-axis table when an assignment of the tilting table as the first or second axis of the additional-axis table is selected by the selection section, and
        to display the diagram obtained by changing the display state of the rotary table of the additional-axis table when an assignment of the rotary table as the first or second axis of the additional-axis table is selected by the selection section.

* * * * *